Patented Sept. 3, 1946

2,407,146

UNITED STATES PATENT OFFICE 2,407,146

METHOD OF COATING SURFACES WITH POWDER

Christopher Phillip Fagan, Danbury, England, assignor to Radio Corporation of America, a corporation of Delaware No Drawing. Application May 1, 1944, Serial No. 533,667. In Great Britain February 26, 1943

2 Claims. (Cl. 117—33.5)

1

This invention relates to the binding of various conducting surfaces on glass, mica, and so forth.

The invention finds useful application in the preparation of so-called end-view screens for cathode ray tubes and similar electronic devices. It also finds useful application in the production of a base upon which metals, such as copper, nickel, and other metals may be deposited electrolytically.

According to the invention, the method of producing a conducting surface upon a carrier body of glass, mica, and so forth, includes the steps of applying to the carrier body a fine suspension of silver oxide in amyl acetate, drying the suspension, reducing the homogenous oxide in hydrogen, and baking.

In the binding of conducting surfaces onto carrier bodies for so-called side-view screens in cathode-ray tubes, a number of methods have been employed. For example "Aquadag" chemically deposited silver, and platinum (prepared by the action of heat on the product known as "Liquid Silver") an organic body prepared by Johnson Maltley which produces platinum upon being heated, have been used, and of these the last mentioned has been the most successful, although the platinum film has proved difficult to prepare.

According to a feature of the present invention, the manufacture of side-view screens having a conducting surface on a carrier body, includes the steps of applying to the carrier body a fine suspension of silver oxide in amyl acetate, drying the suspension, reducing the homogenous oxide in hydrogen, baking, wetting the thus-produced white silver surface on the carrier body with a 1% solution of silicon ester (silicon tetra-ethyl) in ethyl oxalate, dusting upon the silicon ester film a powdered fluorescent material, and heat treating.

It is advantageous to incorporate 1% pyroxylin in the amyl acetate in the production of the conducting surface.

The final heat-treatment consists of baking at a temperature not exceeding 450° C. for one hour, the reducing in hydrogen is effected at 90° C., and the baking, after the fluorescent has been applied, is effected at a temperature not exceeding 350° C. for one hour.

The method of preparing a conductive silver surface was evolved for end-view screens after a number of trials, and involves the use of a fine suspension of silver oxide in amyl acetate. This suspension may be obtained by ball-milling the mixture being then run onto the glass of the tube

2 and dried. After drying, the resulting film of homogenous oxide is to be reduced in hydrogen at 90° C. and baked further at 450° C. for one hour. The powder required is then dusted onto the white silver surface, the binder used being a 1% solution of silicon ester (silicon tetra-ethyl) in ethyl oxalate. It was found of advantage to incorporate 1% of pyroxylin in the amyl acetate.

The formula for the silver oxide suspension mixture is as follows:

| | |
|---|---|
| Amyl acetate | c. c__ 100 |
| Silver oxide | grams__ 150 |
| Pyroxylin | do____ 1.5 |

This mixture should be ball-milled for twelve hours and preserved in a well stoppered bottle, away from the light.

In the production of end-view screens in cathode-ray tubes or similar devices, the liquid should be well-shaken and a few cubic centimeters run down the inside of the cathode-ray tube or other device.

It should be allowed to wet the bulb thoroughly at the screen end and be so manipulated that the total amount of liquid is spread in an even film over the surface of the bulb. It is then dried as quickly as possible, by the aid of a vacuum pump or line, and slight heat. This process is repeated until the silver oxide film is just opaque. The excess is then removed, edges are trimmed, and a slow stream of hydrogen is passed through the bulb. While the hydrogen is passing the bulb is heated to about 90° C. and heating is evenly maintained until the silver is reduced. After complete reduction has been effected, the tube should be heated still further for a period of ten minutes, hydrogen flowing slowly therethrough. The tube is next allowed to cool to room temperature after which the hydrogen stream is discontinued and the tube is baked at 450° C. for one hour. It is then ready for the wetting and dusting operations. Immediately after the dusting operation, the tube should be baked for one hour at 350° C.

A precaution to be observed in the manufacture of side-view screens as set out above is that after the silver oxide has been completely wiped back to the required amount, traces of the remainder should be removed with a rag moistened with amyl acetate as, otherwise, the oxide may react with the glass on baking and yellow stains may develop.

Having now particularly described and ascertained the nature of the said invention and in what manner the same is to be performed, I declare that what I claim is:

1. In the manufacture of end-view screens having a conducting surface on a carrier body the method which includes the steps of applying to the carrier body a fine suspension of silver oxide in amyl acetate containing pyroxylin, drying the suspension, reducing the homogenous oxide in hydrogen around 90° C., baking, wetting the thus-produced white silver surface on the carrier body with a 1% solution of silicon tetraethyl in ethyl oxalate, dusting upon the silicon ester film a powdered fluorescent material, and baking at 350° C.

2. The method according to the preceding claim, wherein the formula for the silver oxide suspension mixture is:

Amyl acetate _____ c. c __ 100
Silver oxide _____ grams __ 150
Pyroxylin _____ do ____ 1.5 this mixture being ball-milled for twelve hours.

CHRISTOPHER PHILLIP FAGAN.